(12) United States Patent
Chung et al.

(10) Patent No.: US 12,242,321 B2
(45) Date of Patent: Mar. 4, 2025

(54) POWER MANAGEMENT METHOD AND ELECTRONIC DEVICE USING SAME

(71) Applicant: ASUSTEK COMPUTER INC., Taipei (TW)

(72) Inventors: Wen Che Chung, Taipei (TW); Hui Chuan Lo, Taipei (TW); Hao-Hsuan Lin, Taipei (TW); Chun Tsao, Taipei (TW); Jun-Fu Chen, Taipei (TW); Ming-Hung Yao, Taipei (TW); Jia-Wei Zhang, Taipei (TW); Kuan-Lun Chen, Taipei (TW); Ting-Chao Lin, Taipei (TW); Cheng-Yen Lin, Taipei (TW); Chunyen Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 75 days.

(21) Appl. No.: 18/308,334

(22) Filed: Apr. 27, 2023

(65) Prior Publication Data
US 2024/0069618 A1 Feb. 29, 2024

(30) Foreign Application Priority Data
Aug. 23, 2022 (TW) .................................. 111131741

(51) Int. Cl.
*G06F 1/3212* (2019.01)
(52) U.S. Cl.
CPC .................. *G06F 1/3212* (2013.01)

(58) Field of Classification Search
CPC ...................................................... G06F 1/3212
See application file for complete search history.

(56) References Cited

U.S. PATENT DOCUMENTS

| 10,097,021 | B2* | 10/2018 | Horie | H02J 7/0042 |
| 2010/0231431 | A1* | 9/2010 | Sakamoto | G08C 17/02 |
| | | | | 341/176 |
| 2013/0339757 | A1* | 12/2013 | Reddy | G06F 1/3212 |
| | | | | 713/300 |

(Continued)

FOREIGN PATENT DOCUMENTS

| CN | 104009262 B | 11/2016 |
| CN | 107179819 B | 6/2021 |

(Continued)

*Primary Examiner* — Aurel Prifti
(74) *Attorney, Agent, or Firm* — MUNCY, GEISSLER, OLDS & LOWE, P.C.

(57) ABSTRACT

The disclosure provides a power management method. The power management method is applicable to an electronic device. The electronic device is electrically coupled to an adapter, and includes a system and a battery. The adapter has a feed power. The battery has a discharge power. The power management method of the disclosure includes: reading a power value of the battery; determining a state of the system; and discharging power to the system, when the system is in a power-on state and the power value is greater than a charging stopping value, by using the battery, and controlling, according to the discharge power and the feed power, the adapter to selectively supply power to the system. The disclosure further provides an electronic device using the power management method.

8 Claims, 6 Drawing Sheets

(56) References Cited

U.S. PATENT DOCUMENTS

| | | | | |
|---|---|---|---|---|
| 2014/0009119 | A1* | 1/2014 | Ibe | H02J 7/00 |
| | | | | 320/134 |
| 2015/0046727 | A1* | 2/2015 | Kobayashi | G06F 1/266 |
| | | | | 713/300 |
| 2018/0172770 | A1* | 6/2018 | Sun | B60L 58/10 |
| 2019/0187766 | A1* | 6/2019 | Hirosawa | G06F 1/28 |
| 2020/0044458 | A1* | 2/2020 | Yoon | G06F 1/263 |
| 2021/0296910 | A1* | 9/2021 | Zhang | H02J 7/0063 |
| 2021/0313819 | A1* | 10/2021 | Hattori | H02J 7/00034 |
| 2022/0224142 | A1 | 7/2022 | Lee et al. | |
| 2024/0339852 | A1* | 10/2024 | Cheng | H02J 7/007182 |

FOREIGN PATENT DOCUMENTS

| | | |
|---|---|---|
| CN | 114069745 A | 2/2022 |
| CN | 113258596 B | 4/2022 |
| CN | 109935920 B | 5/2022 |
| TW | I763242 B | 5/2022 |

\* cited by examiner

ABSTRACT# POWER MANAGEMENT METHOD AND ELECTRONIC DEVICE USING SAME

CROSS-REFERENCE TO RELATED APPLICATION

This application claims the priority benefit of Taiwan application serial No. 111131741, filed on Aug. 23, 2022. The entirety of the above-mentioned patent application is hereby incorporated by reference herein and made a part of the specification.

BACKGROUND OF THE INVENTION

Field of the Invention

The disclosure relates to a power management method and an electronic device using the power management method.

Description of the Related Art

Existing notebook computers are all equipped with batteries for mobile use. When a notebook computer is in use for a long time while being connected to the mains, it is easy to cause the battery to be in a fully-charged state for a long time. The battery being in a fully-charged state for a long time accelerates the aging of the battery and easily causes the battery to swell, resulting in impact on the service life of the battery. In addition, when the notebook computer is in use while being connected to the mains, to reduce the electricity quantity of the battery to an appropriate range to prolong the service life of the battery, it usually only relies on self-consumption of the battery, which needs to consume a long time.

BRIEF SUMMARY OF THE INVENTION

The disclosure provides a power management method. The power management method is applicable to an electronic device. The electronic device is electrically coupled to an adapter, and includes a system and a battery. The adapter has a feed power. The battery has a discharge power. The power management method of the disclosure includes: reading a power value of the battery; determining a state of the system; and discharging power to the system, when the system is in a power-on state and the power value is greater than a charging stopping value, by using the battery, and controlling, according to the discharge power and the feed power, the adapter to selectively supply power to the system.

The disclosure further provides an electronic device. The electronic device is electrically coupled to an adapter. The adapter has a feed power. The electronic device of the disclosure includes a system, a battery, and a power management unit. The battery has a discharge power and a power value. The power management unit is electrically coupled to the system and the battery, and is configured to: read the power value; determine a state of the system; and discharge power to the system, when the system is in a power-on state and the power value is greater than a charging stopping value, by using the battery, and control, according to the discharge power and the feed power, the adapter to selectively supply power to the system.

With regard to the power management method and the electronic device using the power management method in the disclosure, a power value of the battery is readable, and when the system is in a power-on state, and the power value of the battery is greater than the charging stopping value, the battery is utilized to discharge the system. In this way, the discharging of the battery is accelerated, to prolong the service life of the battery. In addition, with regard to the power management method and the electronic device using the power management method in the disclosure, the adapter is further utilized to make up for the insufficient power supply of the battery, which helps to maintain the stability of the system and prevents the user experience from being affected by the unstable performance of the system.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
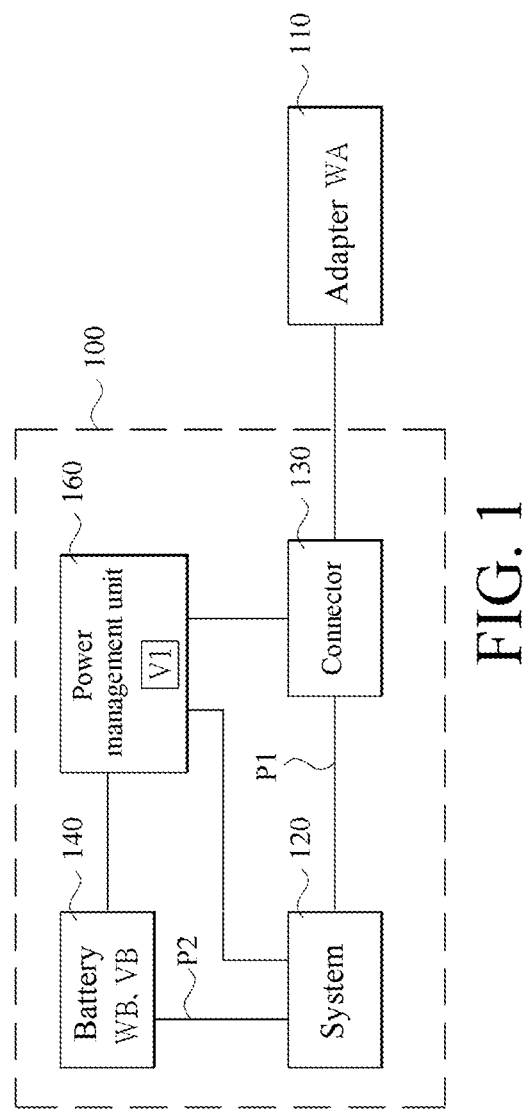
FIG. 1 is a schematic block diagram of an electronic device according to an embodiment of the disclosure.

FIG. 1 is a schematic block diagram of an electronic device 100 according to an embodiment of the disclosure. The electronic device 100 is an electronic device 100, such as a notebook computer, a tablet computer, or a smartphone, including a built-in battery and electrically coupled to an adapter 110 for being charged.

As shown in the figure, the electronic device 100 includes a system 120, a connector 130, a battery 140, and a power management unit 160. The system 120 is a computer system, including a processor, configured to process information and perform computation.

The connector 130 is connected to an adapter 110 in a plugged manner. The connector 130 is electrically coupled to the system 120 through a feed path P1. In an embodiment, the connector 130 is a power connector, for example, a DC power jack.

The battery 140 is electrically coupled to the system 120 through a discharge path P2, and has a discharge power WB and a power value VB. The discharge power WB is in unit of Watts, and represents a power provided by the battery 140. The power value VB is a percentage, representing a ratio of the remaining electricity quantity in the battery 140 to an electricity quantity of the battery 140 when the battery 140 is fully charged.

The power management unit 160 is electrically coupled to the system 120 to determine a state of the system 120. The power management unit 160 is electrically coupled to the connector 130 to determine whether the adapter 110 is connected to the connector 130 in a plugged manner for supplying power. The power management unit 160 is further electrically coupled to the battery 140 to read the power value VB of the battery 140.

The power management unit 160 is a chip, a circuit, a part of a chip, or a module including a chip and a circuit. In addition, the power management unit 160 is also a combination of a software program and hardware or a combination of firmware and hardware. In an embodiment, the power management unit 160 is an embedded controller (EC) or a microcontroller (MCU).

When the system 120 is in a power-on state, and the power value VB of the battery 140 is greater than a charging stopping value V1, the power management unit 160 discharges power to the system 120 by using the battery 140. In this way, the electricity quantity of the battery 140 is rapidly reduced to below the charging stopping value V1, which helps to prolong the service life of the battery 140. The charging stopping value V1 is an electricity quantity criterion at which the system 120 stops charging the battery 140. The setting of the charging stopping value V1 can avoid the battery 140 from having a high electricity quantity for a long time and having its service life affected. In an embodiment, the charging stopping value V1 ranges from 60% to 80%.

In an embodiment, the power management unit 160 controls, according to the discharge power WB of the battery 140 and the feed power WA of the adapter 110, the adapter 110 to selectively supply power to the system 120, so as to avoid the insufficient discharge power WB of the battery 140 from causing unstable performance of the system 120 and affecting the user experience.

Figure 2:
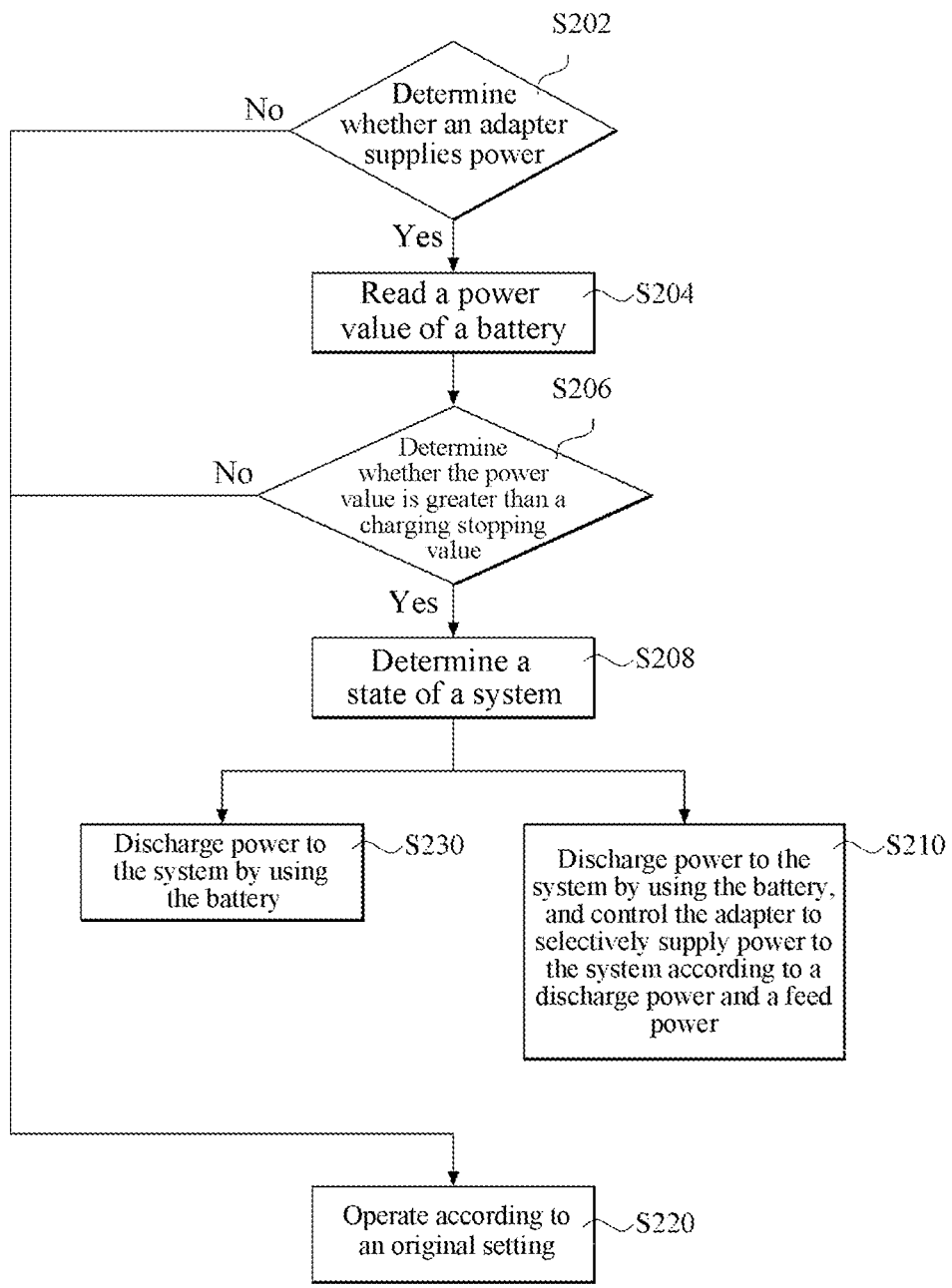
FIG. 2 is a flowchart of a power management method according to an embodiment of the disclosure.

FIG. 2 is a flowchart of a power management method according to an embodiment of the disclosure. The power management method is applicable to the electronic device 100 shown in FIG. 1. The electronic device 100 is electrically coupled to an adapter 110, and includes a system 120 and a battery 140. The power management method of the disclosure includes the following steps.

First, as shown in step S202, it is determined whether the adapter 110 supplies power. If yes, the procedure proceeds to step S204. If not, the procedure proceeds to step S220, to operate according to an original setting. For example, the original setting includes: if the adapter 110 supplies power, the system 120 is powered by the adapter 110; and if the adapter 110 does not supply power, the system 120 is powered by the battery 140.

Next, as shown in step S204, a power value VB is read from the battery 140. Then, as shown in step S206, it is determined whether the power value VB is greater than a charging stopping value V1. If yes, the procedure proceeds to step S208. If not, the procedure proceeds to step S220, to operate according to the original setting.

Then, as shown in step S208, a state of the system 120 is determined. If the system 120 is in a power-on state, the procedure proceeds to step S210. If the system 120 is in a state other than the power-on state, for example, a shutdown state, a standby state, or a dormant state, the procedure proceeds to step S230, and the battery 140 discharges power to the system 120. It is worth noting that when the system 120 is in a state other than the power-on state, the power consumption of the system 120 is small, and the battery 140 discharges power to the system 120, to accelerate the discharging of the battery 140.

When the system 120 is in the power-on state, and the power value VB of the battery 140 is greater than the charging stopping value V1, the procedure proceeds to step S210, to control the battery 140 to discharge power to the system 120, and control, according to the discharge power WB and the feed power WA, the adapter 110 to selectively supply power to the system 120.

In an embodiment, steps S202 to S230 are performed by the power management unit 160 in FIG. 1.

Figure 3:
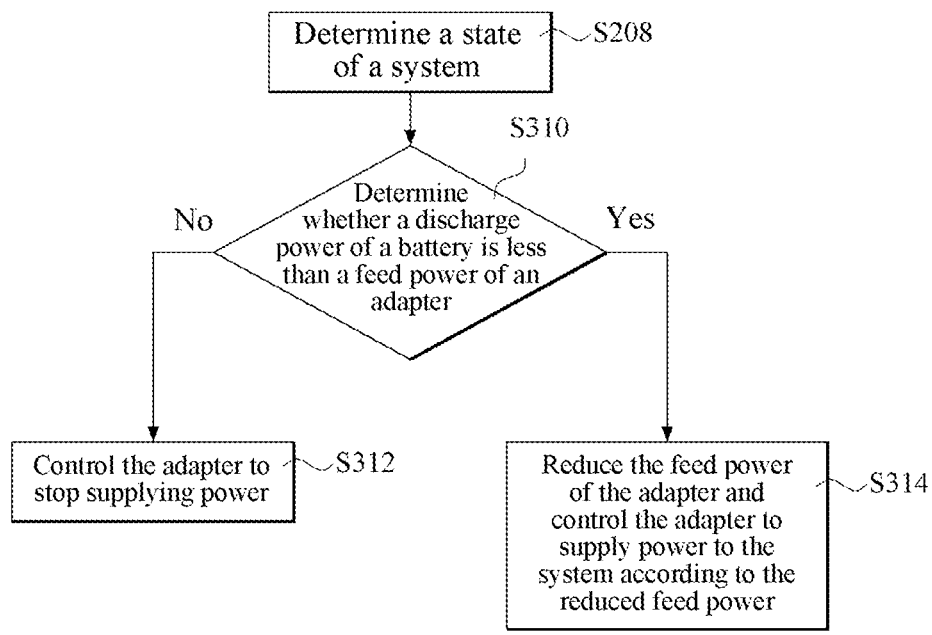
FIG. 3 is a flowchart showing an embodiment of step S210 in FIG. 2.

FIG. 3 is a flowchart showing an embodiment of step S210 in FIG. 2.

Following step S208, when the system 120 is in the power-on state, and the power value VB of the battery 140 is greater than the charging stopping value V1, the procedure proceeds to step S310, to determine whether the discharge power WB of the battery 140 is less than the feed power WA of the adapter 110. If not, the procedure proceeds to step S312. If yes, the procedure proceeds to step S314.

As shown in step S312, when the discharge power WB is greater than or equal to the feed power WA, the adapter 110 is controlled to stop supplying power. In this case, only the battery 140 discharges power to the system 120. Conversely, as shown in step S314, when the discharge power WB is less than the feed power WA, the feed power WA of the adapter 110 is reduced, and the adapter 110 is controlled to supply power to the system 120 according to the reduced feed power WA.

For example, if the feed power WA of the adapter 110 is 65 W, and the discharge power WB of the battery 140 is 76 W, because the discharge power WB is greater than the feed power WA, the adapter 110 stops supplying power to the system 120; Conversely, if the feed power WA of the adapter 110 is 180 W, and the discharge power WB of the battery 140 is 78 W, because the discharge power WB is less than the feed power WA, in addition to that the battery 140 supplies power to the system 120, the adapter 110 also supplies power to the system 120 according to the reduced feed power WA.

In an embodiment, a feed current of the adapter 110 is reduced according to the following formula (1), and further, the feed power WA of the adapter 110 is reduced.

$$C1 = C0*(WA0 - R*WB)/WA0 \qquad \text{formula (1)}$$

WA0 is a feed power of the adapter 110 before adjustment, WB is the discharge power of the battery 140, C0 is a feed current before the adjustment, C1 is a feed current after the adjustment, and R is an adjustment parameter. R is adjustable according to actual conditions. In an embodiment, R is between 0.6 and 1. The feed current C1 adjusted according to formula (1) is less than the feed current C0 before the adjustment, so that the feed power of the adapter 110 is reduced.

Through step S314, even if the battery 140 is in a discharge state and discharges power to the system 120, the adapter 110 is also used to make up for the insufficient part caused by the discharging of the battery 140, so that a total quantity of electricity obtained by the system 120 remains stable, to avoid the discharging of the battery 140 from causing unstable performance of the system 120 and affecting the user experience.

Figure 4:
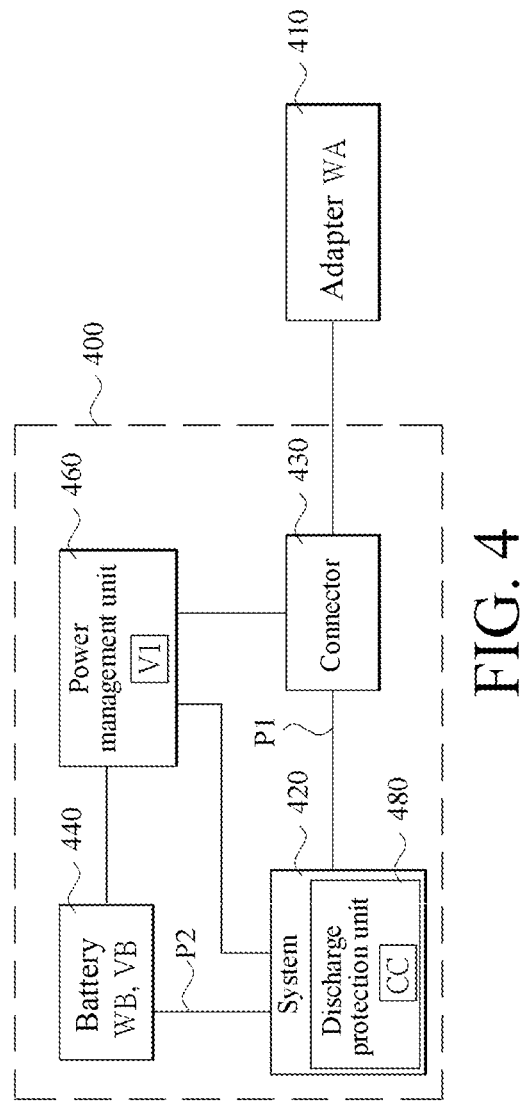
FIG. 4 is a schematic block diagram of an electronic device according to another embodiment of the disclosure.

FIG. 4 is a schematic block diagram of an electronic device 400 according to another embodiment of the disclosure. The electronic device 400 is an electronic device 400, such as a notebook computer, a tablet computer, or a smartphone, including a built-in battery 440 and electrically coupled to an adapter 410 for being charged.

The electronic device 400 of this embodiment includes a system 420, a connector 430, a battery 440, and a power management unit 460.

Compared with the embodiment of FIG. 1, the system 420 of this embodiment includes a discharge protection unit 480.

The discharge protection unit 480 has a discharge protection value CC. The system 420 adjusts its operating performance by comparing a current supplied to the system 420 and the discharge protection value CC, to avoid problems, such as overheating, of the system 420. In an embodiment, the discharge protection value CC is a current threshold.

When the system 420 is in a power-on state, a power value VB is greater than a charging stopping value V1, and a discharge power WB is less than a feed power WA, the power management unit 460 reduces the feed power WA of the adapter 410, and adjust the discharge protection value CC according to the reduced feed power WA, to ensure that the battery 440 performs discharging smoothly.

The main reason for such an adjustment is that the system 420 generally has a discharge protection function, which is provided to reduce power consumption of the system 420 when the system 420 overheats. This function limits the discharging of the battery 440. To ensure that the battery 440 performs discharging smoothly, in this embodiment, a discharge protection threshold is increased by adjusting the discharge protection value CC. On the other hand, the power management unit 460 still ensures the stable power supply of the adapter 410 and the battery 440, so as to avoid the problem that the performance of the system 420 is unstable.

In an embodiment, the discharge protection value CC can be adjusted according to the following formula (2).

$$CC1=CC0*C0/C1 \qquad \text{formula (2)}$$

CC0 is a discharge protection value before the adjustment, and CC1 is a discharge protection value after the adjustment. Because the feed current C1 after the adjustment is less than the feed current C0 before the adjustment, the discharge protection value CC1 after the adjustment is higher than the discharge protection value CC0 before the adjustment.

The discharge protection unit 480 is a chip, a circuit, a part of a chip, or a module including a chip and a circuit. In addition, the discharge protection unit is also a combination of a software program and hardware or a combination of firmware and hardware. In an embodiment, the discharge protection unit 480 includes a memory, configured to store the discharge protection value CC.

Figure 5:
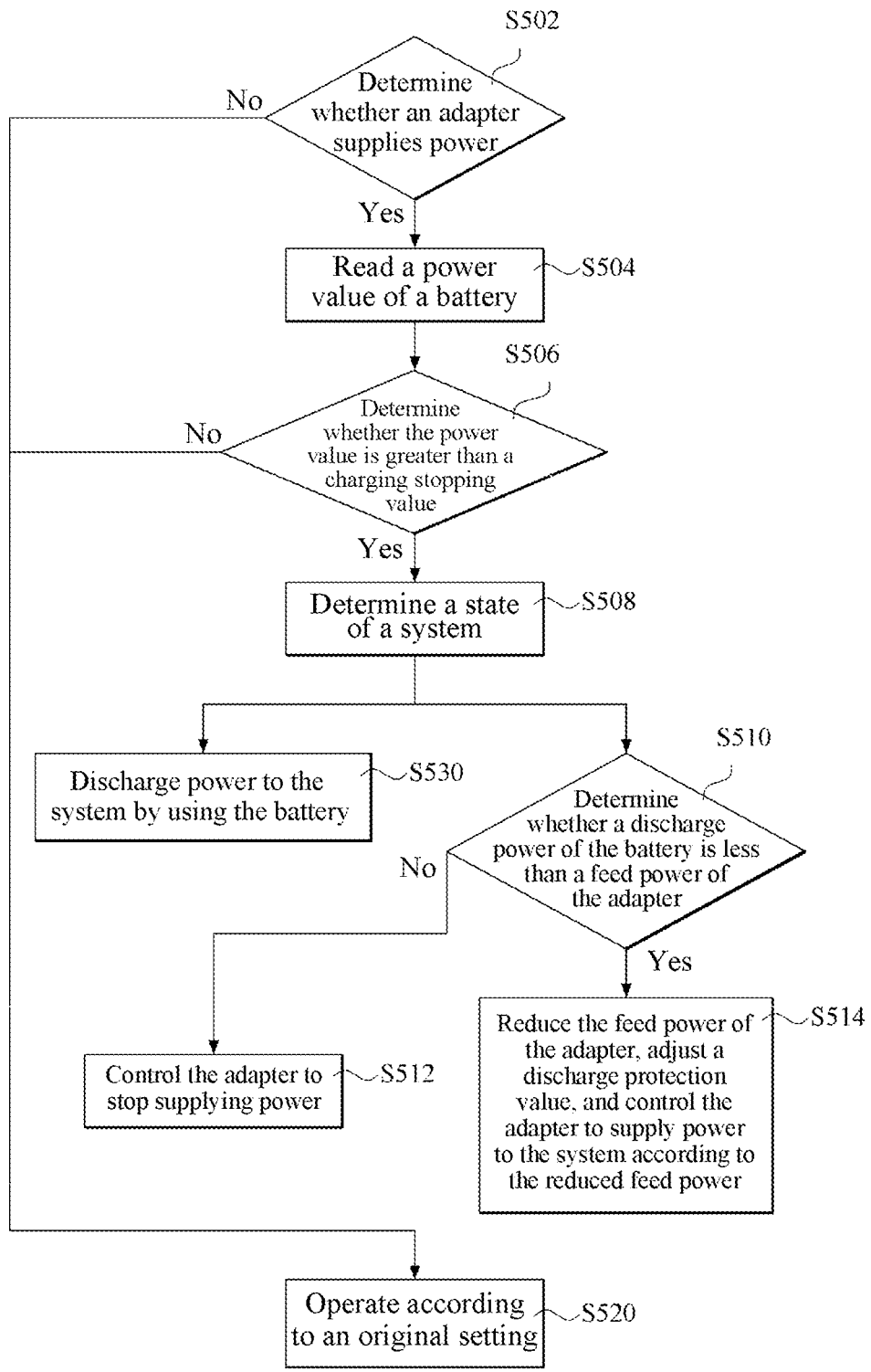
FIG. 5 is a flowchart of a power management method according to another embodiment of the disclosure.

FIG. 5 is a flowchart of a power management method according to another embodiment of the disclosure. The power management method is applicable to the electronic device 400 shown in FIG. 4.

First, as shown in step S502, it is determined whether the adapter 410 supplies power. If yes, the procedure proceeds to step S504. If not, the procedure proceeds to step S520, to operate according to the original setting. For example, the original setting includes: if the adapter 410 supplies power, the system 420 is powered by the adapter 410; and if the adapter 410 does not supply power, the system 420 is powered by the battery 440.

Next, as shown in step S504, a power value VB is read from the battery 140. Then, as shown in step S506, it is determined whether the power value VB is greater than a charging stopping value V1. If yes, the procedure proceeds to step S508. If not, the procedure proceeds to step S520.

Then, as shown in step S508, a state of the system 420 is determined. If the system 420 is in a power-on state, the procedure proceeds to step S510. If the system 420 is in a state other than the power-on state, for example, a shutdown state or a dormant state, the procedure proceeds to step S530, and the battery 440 discharges power to the system 420.

When the system 420 is in the power-on state, and the power value VB of the battery 440 is greater than the charging stopping value V1, the procedure proceeds to step S510, to determine whether the discharge power WB of the battery 440 is less than the feed power WA of the adapter 410. If not, the procedure proceeds to step S512. If yes, the procedure proceeds to step S514.

As shown in step S512, when the discharge power WB is greater than or equal to the feed power WA, the adapter 410 is controlled to stop supplying power. In this case, only the battery 440 discharges power to the system 420.

Conversely, as shown in step S514, when the discharge power WB is less than the feed power WA, the feed power WA of the adapter 410 is reduced, the discharge protection value CC is adjusted, and the adapter 410 is controlled to supply power to the system 420 according to the reduced feed power WA.

Figure 6:
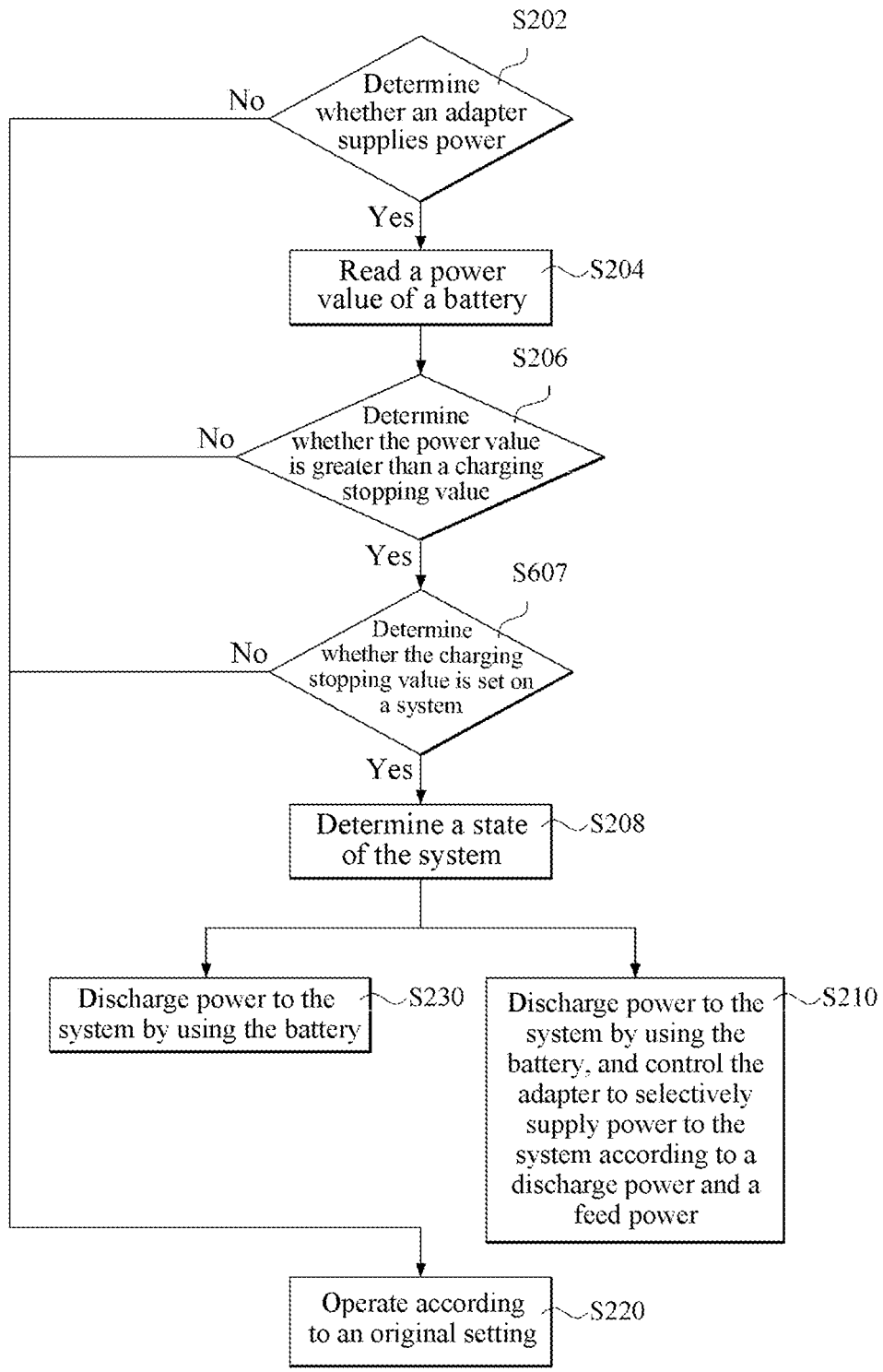
FIG. 6 is a flowchart of a power management method according to still another embodiment of the disclosure.

FIG. 6 is a flowchart of a power management method according to still another embodiment of the disclosure. The power management method is applicable to the electronic device 100 shown in FIG. 1.

Compared with the embodiment of FIG. 2, the power management method of this embodiment further includes step S607 before determining a state of the system 120 (that is, step S208), to determine whether a charging stopping value V1 is set on the system 120. The charging stopping value V1 represents an electricity quantity criterion for stopping charging the battery 140, for example, 60% or 80%.

If the charging stopping value V1 is not set on the system 120, the procedure proceeds to step S220. If the charging stopping value V1 is set on the system 120, the procedure proceeds to step S208. All the other steps of this embodiment are the same as the embodiment of FIG. 2. Details are not described herein again.

With regard to the power management method and the electronic device 100, 400 using the power management method in the disclosure, a power value of the battery 140, 440 is readable, and when the system 120, 420 is in a power-on state, and the power value VB of the battery 140 is greater than the charging stopping value V1, the battery 140, 440 is controlled to discharge power to the system 120, 420. In this way, the discharging of the battery 140, 440 is accelerated, to prolong the service life of the battery 140, 440. In addition, with regard to the power management method and the electronic device 100, 400 using the power management method in the disclosure, the adapter 110, 410 is further utilized to make up for the insufficient power supply of the battery 140,440, which helps to maintain the stability of the system 120, 420 and prevents the user experience from being affected by the unstable performance of the system 120, 420.

The above are only exemplary embodiments of the disclosure and are not intended to limit the disclosure in any way. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A power management method, applicable to an electronic device, wherein the electronic device is electrically coupled to an adapter and comprises a system and a battery, the adapter has a feed power, and the battery has a discharge power, the power management method comprising:
   reading a power value of the battery;
   determining a state of the system; and
   discharging power to the system, when the system is in a
      power-on state and the power value is greater than a charging stopping value, by using the battery, and controlling, according to the discharge power and the feed power, the adapter to selectively supply power to the system, wherein the charging stopping value represents a predetermined electricity quantity of the battery, and wherein the system comprises a discharge protection unit, and the discharge protection unit has a discharge protection value, according to which a discharge protection function is selectively enabled, wherein when the system is in the power-on state, the power value is greater than the charging stopping value, and the discharge power is less than the feed power, the discharge protection value is adjusted.

2. The power management method according to claim 1, wherein the step of controlling the adapter to selectively supply power to the system comprises:

controlling, when the discharge power is greater than the feed power, the adapter to stop supplying power.

3. The power management method according to claim 1, wherein the step of controlling the adapter to selectively supply power to the system comprises:

reducing the feed power according to the discharge power when the discharge power is less than the feed power, and controlling the adapter to supply power to the system according to the reduced feed power.

4. The power management method according to claim 3, wherein when the discharge power is less than the feed power, the feed power is reduced according to the discharge power and an adjustment parameter.

5. The power management method according to claim 1, wherein before the step of reading the power value of the battery, the method further comprises: determining whether the system is electrically coupled to the adapter.

6. The power management method according to claim 1, wherein before the step of determining the state of the system, the method further comprises: determining whether the charging stopping value is set on the system.

7. An electronic device, electrically coupled to an adapter, wherein the adapter has a feed power, the electronic device comprising:

a system;

a battery, having a discharge power and a power value; and a power management unit, electrically coupled to the system and the battery, and configured to:

read the power value;

determine a state of the system; and discharge power to the system, when the system is in a power-on state and the power value is greater than a charging stopping value, by using the battery, and control, according to the discharge power and the feed power, the adapter to selectively supply power to the system, wherein the charging stopping value represents a predetermined electricity quantity of the battery, and wherein the system comprises a discharge protection unit, and the discharge protection unit has a discharge protection value, according to which a discharge protection function is selectively enabled, wherein when the system is in the power-on state, the power value is greater than the charging stopping value, and the discharge power is less than the feed power, the power management unit increases the discharge protection value.

8. The electronic device according to claim 7, wherein when the discharge power is greater than the feed power, the power management unit controls the adapter to stop supplying power.

* * * * *